Sept. 18, 1934.   J. F. McCANN   1,974,338

SILENT CHAIN

Filed July 26, 1932

WITNESSES
Edw. Thorpe

INVENTOR
John Francis McCann
BY
ATTORNEY

Patented Sept. 18, 1934

1,974,338

UNITED STATES PATENT OFFICE 1,974,338

SILENT CHAIN

John Francis McCann, Springfield, Mass., assignor to Baldwin-Duckworth Chain Corporation, Springfield, Mass., a corporation of Massachusetts Application July 26, 1932, Serial No. 624,856

7 Claims. (Cl. 74—245)

The present invention relates to so-called silent chains and has for its object to produce such a chain so constructed that it will have great strength with little or no wear in the articulations or joints and therefore no perceptible change or variation in the length, and also one in which the articulations or joints of the pivotal links are so formed as to provide alternately operating thrust contacts above and below the pivotal centers, alternately operating on the opposite sides of the joints, producing not only a practically continuous line of thrust but obviating any tendency of the chain to swing out of line under the influence of centrifugal action, and thus insure a smoothly acting, properly lubricated movement at all times, with the consequent effective engagement with the teeth of the sprocket wheels, and the elimination of wear between the chain and sprocket teeth and the resultant chattering.

With these objects in view the present invention consists of a silent chain made up of uniform links, in which the coupling pins are arranged in pairs, each pair being rigidly held in spaced relation, with alternate groups of links having a limited turning movement thereon, while other alternate groups of links are rigidly held on the coupling pins with no pivotal movement thereon and each connection providing complementary flat thrust contacts between said pins and links above and below a longitudinal contact line at diametrically positioned points on opposite sides of the coupling pins, said contacts in the pivotal connections operating alternately above and below a central line on opposite sides of the pins, as said links turn on said pins. It further consists of the devices and combinations of devices which will be hereinafter described and claimed.

The present invention is shown in the accompanying drawing in which

Similar characters of reference will be employed to designate corresponding parts.

Figures 4, 5, 6, 7:
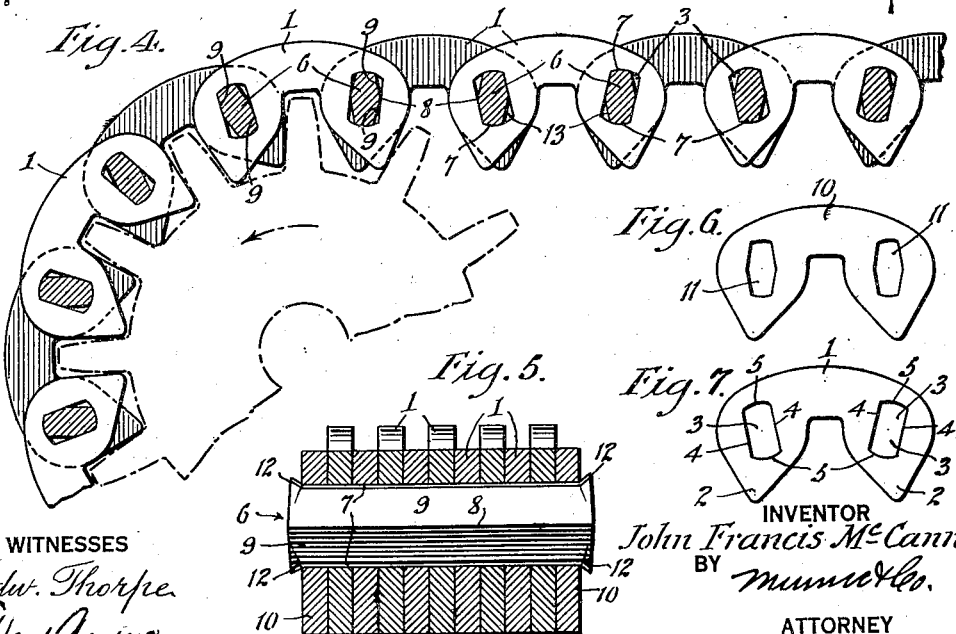
Fig. 4 shows a view similar to Fig. 2 excepting that the chain is shown as it passes around a sprocket wheel, the latter being shown in dotted lines.
Fig. 5 is a transverse sectional view taken on the line 5—5 in Fig. 1, looking in the direction of the arrows.
Fig. 6 shows a side elevation of one of the pin-anchoring links.
Fig. 7 shows a side elevation of one of the uniform chain links.

The chain is made up of a plurality of groups of uniform links 1, as many of such links being employed as may be necessary, dependent upon the width and length of the chain required. Each link is formed as shown in Fig. 7, with the usual sprocket-engaging members 2, and is provided at opposite ends with openings 3, the openings at each end being in that form shown in the drawing, each having parallel straight sides 4 and curved upper and lower ends 5. The pair of openings in each link are angularly disposed with relation to each other diverging upwardly, the angle of inclination being such that when in alignment with each other lengthwise of the chain and while passing around the sprocket, the said openings will co-operate with the pivotal pins in a manner which will be hereinafter fully described.

Figure 1:
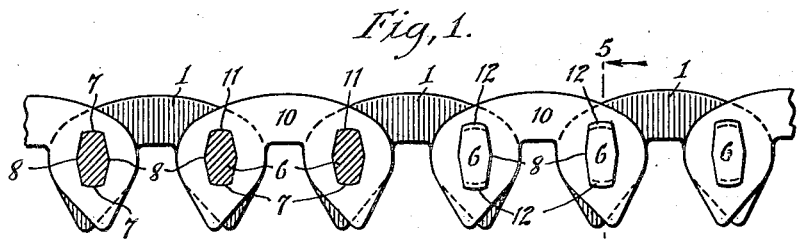
Fig. 1 shows in side elevation and partial sectional view as indicated by the dotted line 1—1 in Fig. 3 looking in the direction of the arrows in that figure, a section of a chain embodying the present invention.
Figure 2:
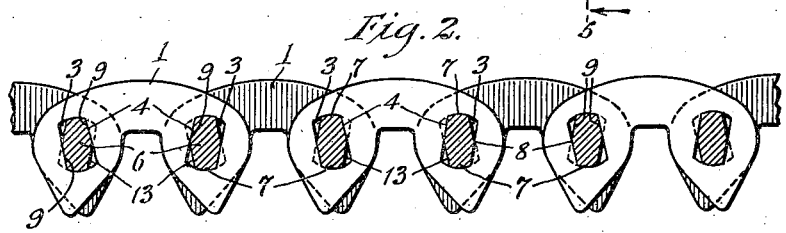
Fig. 2 is a sectional view taken on the line 2—2 in Fig. 3, looking in the direction of the arrows in that figure.

The pivotal pins 6 will of course be of such length as may be required by the width of the chain and are in cross section of that shape shown in Figs. 1, 2, and 4. In vertical dimensions they are substantially as high as the space between the curved top and bottom of the openings 3, and the top and bottom edges of the pins 6 are curved as indicated at 7, the curvature corresponding to that of the curved ends 5 of the openings 3 in the links. On a line corresponding to its longitudinal axis, each pin 6 is of a width substantially that of the distance between the parallel side walls 4, of the openings 3 in the links, and along their opposite sides each pin is provided with a relatively sharp contact edge 8 extending along its entire length. Above the contact edges 8 each link is provided with inclined contact surfaces extending the full length of the pin, above and below the contact edges 8, and connected along the upper and lower edges by the curved top and bottom of the pins 7. By so forming the pins 6, when they are placed in the openings 3 the contact edges 8 on opposite sides will engage the sides 4, of the openings 3, of the links 1, and because of the cross sectional shape above and below the contact edge 8, the pivotal links may turn to a limited extent on the pins 6, such turning movement being limited by the engagement of the contacts 9 of the pins 6 with the sides 4 of the openings 3 above and below the contact edges 8, as clearly indicated in Figs. 2 and 4, in which the chain is illustrated with the links and pins in the relative positions they assume when straightened out and also as they pass about the sprocket wheel. This turning movement of the groups of pivotal links 1 about the pins 6 is of course limited by the width of the curved upper and lower edges of the pins as compared to the width of the curved tops and bottoms 5, of the openings 3, and the proportions of the openings 3, and the pins 6, are determined by the degree of the turning or rocking movement of the links, required to bring the contact surfaces 9, of the pins 6, in contact with the complementary surfaces formed by the sides 4, of the openings 3, in the links, above and below the contact edges 8 of the pins, and alternately on opposite sides as clearly indicated in the drawing. This operation is such that when these complementary contacts are properly functioning they will all co-operate to form a direct line thrust in the straight line of the chain and when passing about the sprocket wheel, thus the links will be properly positioned to enter and emerge from the space between the sprocket teeth and engage said sprocket teeth in that manner which assures a proper driving action without friction and consequent wear with the resultant chattering.

Figure 3:
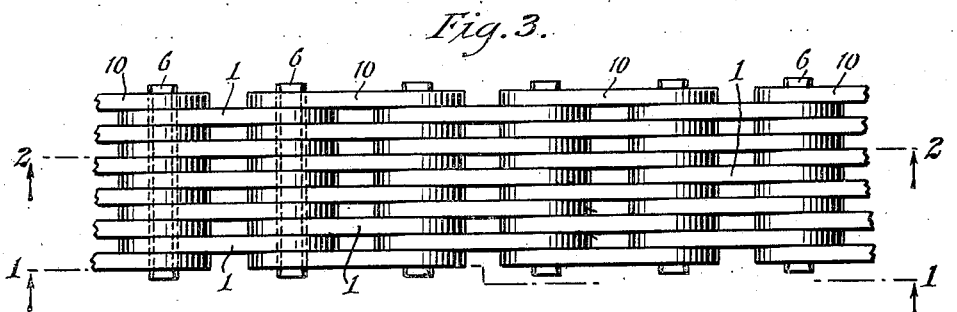
Fig. 3 is a top plan view.

As shown in Figs. 1 and 5 the links are assembled in alternate groups in that manner common to devices of this kind, but the pivotal pins are connected in pairs so that the pins of each pair shall be immovable with relation to each other and to the groups of links which have no pivotal movement thereon. To this end anchoring links 10 are provided (see Fig. 6). They are formed exactly like the links 1 with the exception that the openings 11 are substantially of the same size and cross sectional shape as the pins 6 as indicated in Figs. 1, 3, and 5, and are parallel to each other with the longest diameter extending vertically. The links 10 are fitted over the ends of the pins 6 which are headed up or riveted as shown at 12, thereby not only fixedly connecting pairs of pins immovably, but confining the groups of pivotal links 1 to turn thereon and holding them in articulated relation to each other as shown in Fig. 3. It is of course to be understood that the links are alternately arranged and overlap lengthwise as common in devices of this character and as indicated in Fig. 3, and that the links confined between the anchoring links 10 and co-extensive therewith have no pivotal movement on the pins.

In operation, as indicated in Figs. 2 and 4, the openings in adjacent links will cross each other with the contact surfaces 9 above and below the edge contacts 8 engaged on diametrically opposite sides in adjacent links and alternately above and below the line 8. When turning, the contact surfaces on the pivotal links and the pins will immediately separate until the opposed surfaces above and below as the case may be, come in contact on the opposite sides of the pins 6 and thus at all times except when pivoting about the contact edges 8, the links are supported to produce a longitudinal thrust. The contact surfaces on the pins fixed in the anchoring links 10 and the links confined therebetween and co-extensive therewith do not move with relation to each other but remain always in contact.

The construction of the joint is such that considerable space is provided as indicated at 13, for the reception of lubricating oil, and the movement of the pivotal links will distribute the oil, thus eliminating to a considerable degree any wearing away of the contact edges 8 of the pins and that portion of the walls 4 which are in contact therewith.

It will be noted that in operation neither the pins nor the links have any relative bodily movement radially or transversely of the joints and it will be further noted that there is no rolling action in the joints, the pivotal links having a pivotal movement on the edges 8 of the pins 6 and a sliding contact at all times with the upper and lower edges of said pins, and that the contacting surfaces 9 of the pins 6 engage the complementary surfaces and walls of the pivotal links without a sliding or rolling engagement, such complementary contact surfaces of the pivotal links and pins being either entirely out of engagement or entirely in engagement with each other, while in those links which have no pivotal movement on the pins the contacts at diametrically opposite points are always in contact. By this construction and operation the wear of the joints is reduced to an absolute minimum. I regard this as a very important feature of my invention.

It is an important feature of the present invention that the construction permits a relative pivotal action between the pivotal links and pins, while at the same time maintaining the pins in contact at all times along the top and bottom with the openings in the links, thus preventing a relative radial movement of the pins and links, and so controlling the limited pivotal movement of the pivotal links that when the limit of such pivotal movement in either direction is reached the opposite sides of the openings will alternately be brought into contact with the bearing surfaces on the pins above and below a line cutting the axis of the pins, thus providing a continuous thrust bearing throughout the straight line of the chain and also in that portion of the chain passing about the sprocket wheel, there being of course a shifting of this contact in the pivotal links as the chain passes over the axis of the sprocket, as clearly indicated in Fig. 4. By this construction the wear of the parts is reduced to a minimum and no radial movement of the pins is either possible or required in order that the articulations shall function.

It will be further noted that because the openings 11 in the anchoring links 10 are arranged parallel to each other and extend vertically as shown in Fig. 6 of the drawing, while the openings 3 in the links 1 are inclined with relation to each other, diverging at a slight angle from the bottom of the openings toward the top as shown in Fig. 7 of the drawing, that the group of links 1 which are co-extensive with and confined between the anchoring links 10 have no movement with relation to the coupling pins 6, and that said pins 6 are fixedly held by the anchoring links 10 in the links co-extensive with and confined therebetween, and that the diametrically positioned contact surfaces on opposite sides of said coupling pins 6 are always in contact with the co-operating contact surfaces at opposite sides of the openings 3 above and below the contact edges 8 of the coupling pins 6, and this relative position of the coupling pins, anchoring links 10, and the links 1 co-extensive therewith never changes during the operation of the chain. Thus the flexing of the chain is accomplished by the turning of the adjacent links 1, which are alternately arranged and engage at their opposite ends the coupling pins positioned at the ends of adjacent groups of links confined between the anchoring links 10. By this arrangement, while the chain may be freely flexed as it passes around the sprocket wheel, yet it cannot sag in the upper run of the chain and at all times the complementary bearing surfaces of the coupling pins and links will insure a practically continuous thrust supported by the co-operation of the complementary contact surfaces of the links and pins in those links which are free to turn therein, as well as in the fixed links.

As the operation has been sufficiently set forth in connection with the foregoing description of the construction, further description of the operation is deemed unnecessary.

I claim:

1. A silent chain comprising anchoring links, coupling pins fixedly connected to the opposite ends of each of said anchoring links, a plurality of uniform links each having upwardly diverging angularly disposed openings at its opposite ends, groups of said links co-extensive with each pair of anchoring links mounted on said coupling pins, adjacent groups of links mounted to turn on said coupling pins, said coupling pins and the walls of the openings in said links having complementary flat thrust contact surfaces above and below the longitudinal axis of said coupling pins, the contact surfaces on opposite sides of said pins and the groups of links co-extensive with the anchoring links being in constant engagement at diagonally opposite points, while the contact surfaces in the groups of links mounted to turn on said pins alternately contact with each other at diagonally opposite points above and below the axis of said pins when in operation to limit the turning movement.

2. A silent chain comprising anchoring links and coupling pins, said coupling pins arranged in pairs and fixedly secured at the opposite ends of each pair of said anchoring links with the vertical axis of said pins perpendicular to the line of draft, groups of uniform links engaging said pins to have a limited turning movement thereon, flat thrust contact surfaces on said pins and links to limit the relative turning movement of said pins and links, said flat thrust contact surfaces on opposite sides of said pins and at diagonally opposite points above and below the longitudinal axis of the coupling pins acting alternately.

3. A silent chain comprising pairs of anchoring links and a plurality of uniform links, coupling pins arranged in pairs and fixedly held by the anchoring links one at each end thereof in spaced relation to each other, groups of said links having a limited turning movement on said pins, complementary flat thrust contacts on said pins and the links mounted to turn thereon, the thrust contacts being above and below a longitudinally extending contact line on opposite sides of the pins and contacting alternately above and below said contact line at diagonally opposite points as the said links turn on said pins.

4. A silent chain comprising anchoring links, uniform links arranged in groups each link having openings at its opposite ends disposed at an angle to each other and diverging upwardly, a pair of coupling pins fixedly secured to the anchoring links one at each end on which adjacent groups of links are mounted for a limited turning movement, the upper and lower ends of the openings in the links and the top and bottom edges of the coupling pins being curved on a radius struck from the center of said pins and openings, said coupling pins in constant contact with the upper and lower ends of the openings in the links, and also along a longitudinal central line at opposite sides of said coupling pins, said coupling pins having beveled contact surfaces above and below said contact line in intermittent contact with the walls of the openings of the links mounted to turn thereon on opposite sides of and above and below the longitudinal contact lines of said pins, while the groups of links located between and co-extensive with the anchoring links are held in fixed relation to the coupling pins.

5. A silent chain comprising pairs of anchoring links, coupling pins fixedly mounted at opposite ends of said links and a plurality of groups of uniform links, alternate adjacent groups being fixedly mounted on said pins and having an opening at each end, said openings having straight parallel sides with the top and bottom curved and diverging upwardly, the coupling pins being passed through said openings and fixed to the anchoring links and pivotally connecting the opposite ends of alternate groups of links, said coupling pins having a longitudinally extending centrally disposed bearing edge along each side and in contact with the straight sides of the link openings, said pins rounded along the top and bottom to correspond to the curvature at the top and bottom of the link openings and uniformly beveled above and below the said bearing edges in such manner that when the pivotal links are turned about said pins the beveled faces of said pins above and below the bearing edges on opposite sides will engage the walls of the openings above and below said bearing edges at diagonally opposite points.

6. In a silent chain in combination, an anchoring link, fixed bearings carried at opposite ends thereof, said bearings being angular in cross section and having contact points on opposite sides at the widest part thereof, inclined flat thrust contacts on opposite sides of the bearings and extending equal distances above and below the contact points, the vertical axes of said bearings being perpendicular to the line of draft of the chain, links having an opening at opposite ends arranged to receive and turn about said fixed bearings, the distance between the contact points of the bearings corresponding to the width of the openings in said links, said openings having parallel sides and rounded ends, and the openings of each link diverging upwardly, the rounded ends of said openings conforming to and in contact with the top and bottom of the fixed bearings.

7. A silent chain comprising anchoring links and coupling pins, said coupling pins having beveled surfaces on opposite sides meeting along a longitudinal central line and defining the maximum width of said pins, and the upper and lower edges of said pins being laterally curved, said pins being fixedly mounted one at each end of each pair of anchoring links with its vertical axis perpendicular to the line of draft, and groups of uniform links having at each end an angularly disposed opening, said openings having parallel side walls and curved end walls of a width substantially that of the maximum width of the pins and of a height corresponding to the vertical height of the pins, with the curved upper and lower edges of said pins in contact with the curved upper and lower ends of said openings.

JOHN FRANCIS McCANN.